(12) United States Patent
Ma (10) Patent No.: US 10,656,418 B2
(45) Date of Patent: May 19, 2020

(54) DISPLAY APPARATUS, HEAD-UP DISPLAY SYSTEM, VEHICLE AND DISPLAY CONTROL METHOD

(71) Applicant: BOE TECHNOLOGY GROUP CO., LTD., Beijing (CN)

(72) Inventor: Sen Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/453,469

(22) Filed: Jun. 26, 2019

(65) Prior Publication Data

US 2020/0033598 A1 Jan. 30, 2020

(30) Foreign Application Priority Data

Jul. 27, 2018 (CN) .......................... 2018 1 0847248

(51) Int. Cl.
| | |
|---|---|
| H04N 13/00 | (2018.01) |
| G02B 27/01 | (2006.01) |
| B60K 35/00 | (2006.01) |
| H04N 9/31 | (2006.01) |

(52) U.S. Cl.
CPC .......... *G02B 27/0101* (2013.01); *B60K 35/00* (2013.01); *H04N 9/3102* (2013.01); *H04N 9/312* (2013.01); *H04N 9/3164* (2013.01); *H04N 9/3188* (2013.01); *B60K 2370/1529* (2019.05)

(58) Field of Classification Search
CPC ............. G02B 27/0101; H04N 9/3102; H04N 9/3164; H04N 9/312; H04N 9/3188; B60K 35/00; B60K 2370/1529
USPC .................... 348/115, 42, 46, 47, 51, 52, 54
See application file for complete search history.

(56) References Cited

U.S. PATENT DOCUMENTS

| | | | |
|---|---|---|---|
| 2011/0090479 A1* | 4/2011 | Jung ..................... | G02B 3/0006 355/67 |
| 2017/0214885 A1* | 7/2017 | Xu ......................... | H04N 7/015 |

* cited by examiner

*Primary Examiner* — Robert Chevalier
(74) *Attorney, Agent, or Firm* — McDermott Will & Emery LLP (57) ABSTRACT

A display apparatus includes a light-emitting component, a controller, a digital micro-mirror device, a first projection assembly and a second projection assembly. The controller is configured to alternately output a first image signal and a second image signal to the digital micro-mirror device. The digital micro-mirror device is configured such that in response to receiving the first image signal, at least one micro-lens is rotated to a respective first preset position, and that in response to receiving the second image signal, at least one micro-lens is rotated to a respective second preset position. The first projection assembly is configured to receive light reflected by the at least one micro-lens located at the respective first preset position and output a first image. The second projection assembly is configured to receive light reflected by the at least one micro-lens located at the respective second preset position and output a second image.

15 Claims, 5 Drawing Sheets

DISPLAY APPARATUS, HEAD-UP DISPLAY SYSTEM, VEHICLE AND DISPLAY CONTROL METHOD

CROSS-REFERENCE TO RELATED APPLICATION

This application claims priority to Chinese Patent Application No. 201810847248. X, filed with the Chinese Patent Office on Jul. 27, 2018, titled "DISPLAY ASSEMBLY AND CONTROL METHOD THEREOF, HEAD-UP DISPLAY SYSTEM, AND AUTOMOBILE", which is incorporated herein by reference in its entirety.

TECHNICAL FIELD

The present disclosure relates to the field of display technologies, and in particular, to a display apparatus, a head-up display system, a vehicle and a display control method.

BACKGROUND

A head-up display (HUD) may project important driving information on a windshield or other optical devices of a vehicle, so that a driver may observe the important driving information without having to lower his or her head. As a result, the driver's line of sight may be kept on a road surface at all times, thereby improving a driving safety.

SUMMARY

In one aspect, a display apparatus is provided. The display apparatus includes a light-emitting component, a controller, a digital micro-mirror device, a first projection assembly and a second projection assembly. The controller is electrically connected to the digital micro-mirror device, and is configured to alternately output a first image signal and a second image signal to the digital micro-mirror device. The digital micro-mirror device is disposed on a light path of the light emitted by the light-emitting component, and includes a plurality of micro-lenses. Each micro-lens is capable of reflecting the light emitted by the light-emitting component. The digital micro-mirror device is configured such that in response to receiving the first image signal, at least one micro-lens is rotated to a respective first preset position, and that in response to receiving the second image signal, at least one micro-lens is rotated to a respective second preset position. The first projection assembly is configured to receive light reflected by the at least one micro-lens located at the respective first preset position and output a first image. The second projection assembly is configured to receive light reflected by the at least one micro-lens located at the respective second preset position and output a second image. The controller is further configured to block the light reflected by the at least one micro-lens located at the respective second preset position from entering the second projection assembly during the output of the first image, and to block the light reflected by the at least one micro-lens located at the respective first preset position from entering the first projection assembly during the output of the second image.

In some embodiments, the controller includes an image controller and an optical path controller. The image controller is electrically connected to the digital micro-mirror device and is configured to alternately output the first image signal and the second image signal to the digital micro-mirror device. The optical path controller is electrically connected to the image controller and is configured to block the light reflected by the at least one micro-lens located at the respective second preset position from entering the second projection assembly during the output of the first image, and to block the light reflected by the at least one micro-lens located at the respective first preset position from entering the first projection assembly during the output of the second image.

In some embodiments, the optical path controller includes a first optical switch and a second optical switch. The first optical switch is disposed between the digital micro-mirror device and the first projection assembly. The second optical switch is disposed between the digital micro-mirror device and the second projection assembly.

In some embodiments, the optical path controller includes a first polarizer, a second polarizer and a polarization conversion element. The first polarizer is disposed between the digital micro-mirror device and the first projection assembly. The second polarizer is disposed between the digital micro-mirror device and the second projection assembly. The polarization conversion element is disposed between the light-emitting component and the digital micro-mirror device. The polarization conversion element has a first polarization state and a second polarization state that are switchable. A polarization direction of the first polarization state is perpendicular to a polarization direction of the second polarization state. The polarization direction of the first polarization state is the same as a polarization direction of the first polarizer, and the polarization direction of the second polarization state is the same as a polarization direction of the second polarizer.

In some embodiments, the display apparatus further includes a first adjusting component configured to adjust a direction of the light emitted by the light-emitting component to direct the adjusted light toward the digital micro-mirror device.

In some embodiments, the light-emitting component includes a plurality of light-emitting diodes capable of emitting light of at least three colors. In some other embodiments, the light-emitting component includes at least one laser capable of emitting light of at least three colors. In some other embodiments, the light-emitting component includes an ultra-high performance lamp capable of producing white light and a color wheel configured to divide the white light into light of at least three colors.

In some embodiments, the first projection assembly includes a first imaging lens and a first display screen. The first imaging lens is configured to receive the light reflected by the at least one micro-lens located at the respective first preset position and form the first image, and the first display screen is configured to display the first image. The second projection assembly includes a second imaging lens and a second display screen. The second imaging lens is configured to receive the light reflected by the at least one micro-lens located at the respective second preset position and form the second image, and the second display screen is configured to display the second image.

In some embodiments, a distance from the digital micro-mirror device to the first display screen in a direction perpendicular to the first display screen and a distance from the digital micro-mirror device to the second display screen in a direction perpendicular to the second display screen are greater than or equal to a set distance D, and $$D = \frac{L_1 + L_2}{2 \cdot \tan\frac{\theta}{2}}.$$

$L_1$ is a size of the first display screen in a set direction, $L_2$ is a size of the second display screen in the set direction, and $\theta$ is an angle between light reflected by one micro-lens of the plurality of micro-lenses when the micro-lens is located at its first preset position and light reflected by the micro-lens when the micro-lens is located at its second preset position. The set direction is an arrangement direction of orthographic projections of the first display screen and the second display screen on a reference plane parallel to the first display screen and the second display screen.

In another aspect, a head-up display system including the display apparatus described above is provided.

In some embodiments, the head-up display system further includes a second adjusting component, and the second adjusting component is configured to enlarge a first image and a second image displayed by the display apparatus and reflect the enlarged first and second images to different positions of a projection screen.

In some embodiments, the second adjusting component includes a first free-form surface mirror, a first mirror and a second free-form surface mirror. The first free-form surface mirror is configured to enlarge the first image displayed by the display apparatus and reflect the enlarged first image to the projection screen. The first mirror is configured to reflect the second image displayed by the display apparatus. The second free-form surface mirror is configured to receive the second image reflected by the first mirror, enlarge the second image and reflect the enlarged second image to the projection screen.

In some embodiments, the second adjusting component includes a second mirror and a third free-form surface mirror. The second mirror is configured to reflect the first image and the second image displayed by the display apparatus. The third free-form surface mirror is configured to receive the first image reflected by the second mirror, enlarge the first image and reflect the enlarged first image to the projection screen and configured to receive the second image reflected by the second mirror, enlarge the second image and reflect the enlarged second image to the projection screen. The third free-form surface mirror receives the first image and the second image at different positions thereon.

In some embodiments, an image distance of an image formed by the first image through the second adjusting component ranges from 2 m to 3 m; and/or, an image distance of an image formed by the second image through the second adjusting component ranges from 7.5 m to 15 m.

In yet another aspect, a vehicle including the head-up display system described above is provided.

In yet another aspect, a display control method applied to the display apparatus described above is provided. The display control method includes a plurality of driving cycles, and each driving cycle includes: outputting a first image signal to a digital micro-mirror device, so that at least one micro-lens of a plurality of micro-lenses in the digital micro-mirror device is rotated to a respective first preset position; controlling a first projection assembly to receive light reflected by the at least one micro-lens located at the respective first preset position and then to output a first image; and blocking light reflected by at least one micro-lens located at a respective second preset position from entering a second projection assembly; and outputting a second image signal to the digital micro-mirror device, so that at least one micro-lens in the digital micro-mirror device is rotated to a respective second preset position; controlling the second projection assembly to receive light reflected by the at least one micro-lens located at the respective second preset position and then to output a second image; and blocking light reflected by at least one micro-lens located at a respective first preset position from entering the first projection assembly.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in some embodiments of the present disclosure will be described clearly and completely with reference to the accompanying drawings in some embodiments of the present disclosure. Obviously, described embodiments are merely some but not all of embodiments of the present disclosure. All other embodiments made on the basis of the embodiments of the present disclosure by a person of ordinary skill in the art shall be included in the protection scope of the present disclosure.

In some examples, a head-up display (HUD) includes a state projection HUD, i.e., a close-range projection HUD, which images common driving information displayed by an image source, such as a vehicle speed, a rotational speed, an amount of fuel, etc., as a virtual image suspended on a hood. In some other embodiments, the HUD includes an augmented reality HUD (AR-HUD), i.e., a long-distance projection HUD. The AR-HUD may be combined with an advanced driver assistant system (ADAS) to virtually display information such as a collision warning, a lane line deviation, and a pedestrian detection in front of a vehicle. In the future, a two-layer HUD capable of simultaneously achieving the state projection and the augmented reality projection is one of development trends of the HUD.

However, angles of view of the state projection and the augmented reality projection are different, imaging distances are also different, and thus two imaging optical paths are required to project images displayed by two image sources, respectively. In the related art, two display apparatuses are provided to provide two image sources, which will increase a cost and a power consumption of a system.

Figure 1:
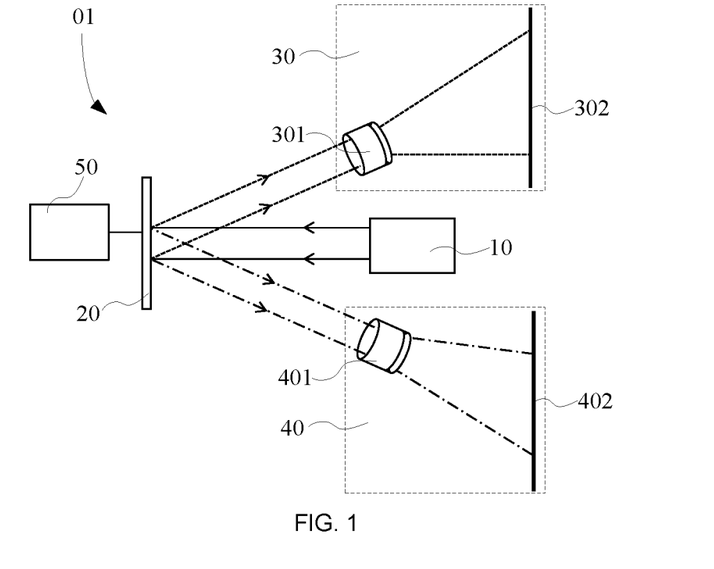
FIG. 1 is a schematic diagram showing a structure of a display apparatus, in accordance with some embodiments.

As shown in FIG. 1, some embodiments of the present disclosure provide a display apparatus 01, and the display apparatus 01 includes a light-emitting component 10, a digital micro-mirror device 20, a first projection assembly 30, a second projection assembly 40 and a controller 50.

The light-emitting component 10 is configured to emit light for displaying an image.

The controller 50 is electrically connected to digital micro-mirror device 20, and is configured to alternately output a first image signal and a second image signal to the digital micro-mirror device 20.

The digital micro-mirror device 20 is disposed on a optical path of the light emitted by the light-emitting component 10. The digital micro-mirror device 20 includes a plurality of micro-lenses, and each micro-lens is capable of reflecting the light emitted by the light-emitting component 10. The optical path described above includes a optical path of the light emitted by the light-emitting component 10, and a optical path of reflected light obtained after the light emitted by the light-emitting component 10 is reflected by at least one device.

The digital micro-mirror device 20 is configured such that in response to receiving the first image signal, at least one micro-lens is rotated to a respective first preset position, and that in response to receiving the second image signal, at least one micro-lens is rotated to a respective second preset position.

The first projection assembly 30 is configured to receive light reflected by the at least one micro-lens located at the respective first preset position, and output a first image.

The second projection assembly 40 is configured to receive light reflected by the at least one micro-lens located at the respective second preset position, and output a second image.

The controller 50 is further configured to block the light reflected by the at least one micro-lens located at the respective second preset position from entering the second projection assembly during the output of the first image, and to block the light reflected by the at least one micro-lens located at the respective first preset position from entering the first projection assembly during the output of the second image.

With this design, during the output of the second image, the first projection assembly 30 will not receive the light reflected by the at least one micro-lens located at the respective first preset position, so that the first projection assembly 30 will not display an image. Therefore, only in a case the plurality of micro-lenses respond to the first image signal, the first projection assembly 30 receives the light reflected by the at least one micro-lens located at the respective first preset position and outputs the first image.

Moreover, during the output of the first image, the second projection assembly 40 will not receive the light reflected by the at least one micro-lens located at the respective second preset position, so that the second projection assembly 40 will not display an image. Therefore, only in a case where the plurality of micro-lenses respond to the second image signal, the second projection assembly 40 receives the light reflected by the at least one micro-lens located at the respective second preset position and outputs the second image.

In some embodiments, the light-emitting component 10 is capable of emitting light of at least three colors to achieve a color display of the display apparatus 01. In some examples, the light-emitting component 10 successively emits light of three primary colors. For example, the light of three primary colors is red light, green light and blue light. For another example, the light of three primary colors is yellow light, magenta light and cyan light. Colors that may be recognized by most human eyes in nature may be obtained by combining the light of the three primary colors.

There are a plurality of types of the light-emitting component 10, which include but not limited to types in the embodiments shown below.

Figure 3:
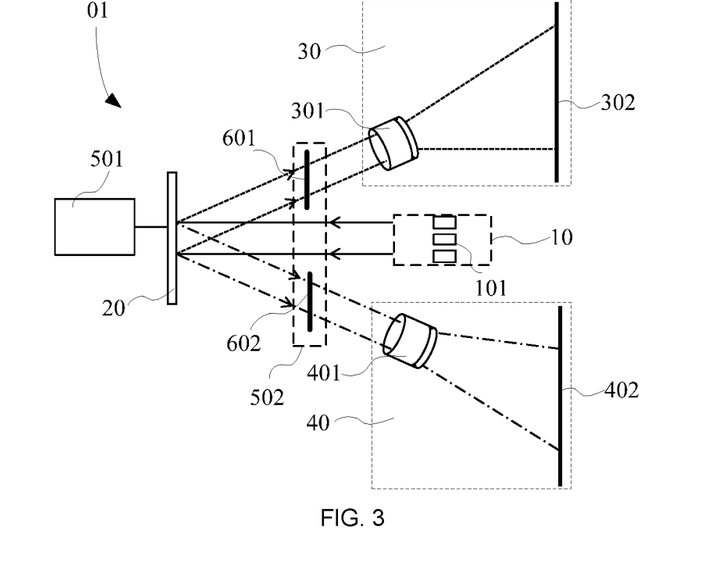
FIG. 3 is a schematic diagram showing a structure of another display apparatus, in accordance with some embodiments.

In some embodiments, as shown in FIG. 3, the light-emitting component 10 includes a plurality of light-emitting diodes (LEDs) 101. Each LED 101 is configured to emit light of one color of the at least three colors, and the plurality of LEDs 101 successively emit the light of the at least three colors. For example, the plurality of LEDs 101 successively emit the light of the three primary colors. For example, in a first period, at least one LED 101 emitting the red light is controlled to be turned on, and LEDs 101 emitting light of other primary colors are controlled to be turned off. In a second period, at least one LED 101 emitting the green light is controlled to be turned on, and LEDs 101 emitting light of other primary colors are controlled to be turned off. In a third period, at least one LED 101 emitting the blue light is controlled to be turned on, and LEDs 101 emitting light of other primary colors are controlled to be turned off.

Figure 4:
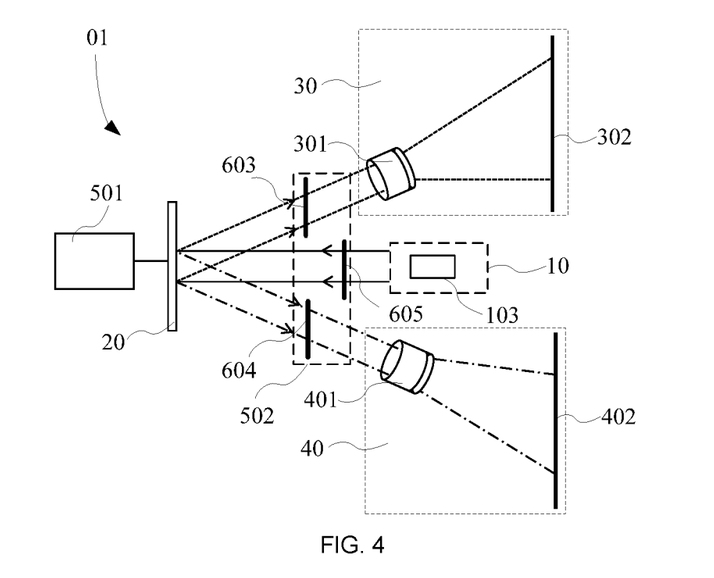
FIG. 4 is a schematic diagram showing a structure of yet another display apparatus, in accordance with some embodiments.

In some other embodiments, the light-emitting component 10 includes at least one laser 103 capable of emitting the light of the at least three colors. For example, as shown in FIG. 4, the light-emitting component 10 includes a single three-primary-color laser 103 configured to successively emit the light of the three primary colors. For another example, the light-emitting component 10 includes three lasers 103, and the three lasers 103 are configured to emit light of the three primary colors respectively.

Figure 5:
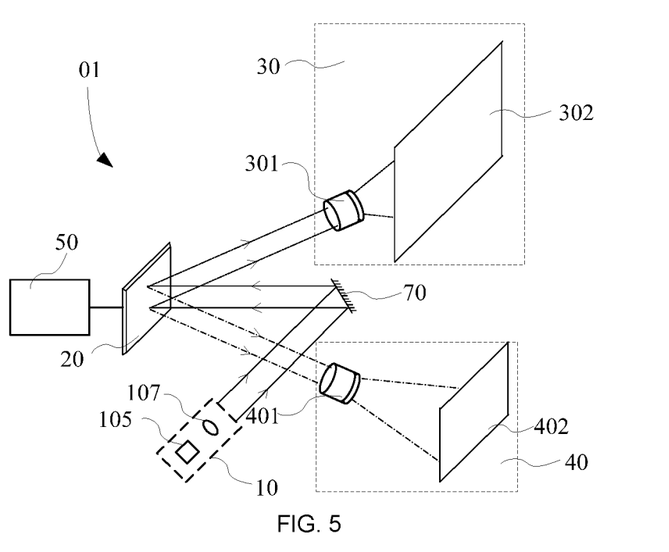
FIG. 5 is a schematic diagram showing a structure of yet another display apparatus, in accordance with some embodiments.

In some other embodiments, as shown in FIG. 5, the light-emitting component 10 includes an ultra-high performance (UHP) lamp (that is, a high-pressure mercury arc lamp) 105 and a color wheel 107. The UHP lamp 105 is configured to emit white light, and the color wheel 107 is configured to divide the white light into the light of the at least three colors, such as the light of the three primary colors. For example, the color wheel 107 is formed by a three-primary-color filter system and is rotated at a preset frequency, for example, a frequency of 60 Hz, so that the light-emitting component 10 successively emits the light of the three primary colors.

Figure 2:
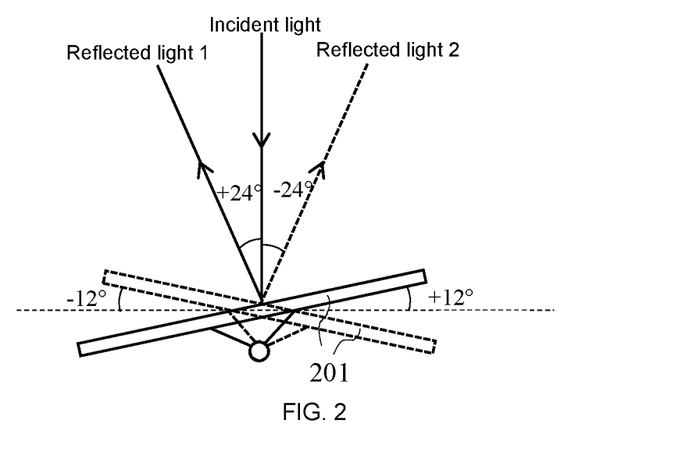
FIG. 2 is a schematic diagram showing rotation of a micro-lens in a digital micro-mirror device, in accordance with some embodiments.

The digital micro-mirror device 20 described above may also be referred to as a digital micro-mirror chip, which includes a plurality of micro-lenses (generally hundreds of thousands or even millions of micro-lenses). The plurality of micro-lenses constitute a micro-mirror array. The plurality of micro-lenses are in one-to-one correspondence with sub-pixels, and an image to be displayed is formed by at least one of the sub-pixels. Each micro-lens is capable of being rotated to its first preset position and its second preset position, and thus the micro-lens is capable of reflecting the light emitted by the light-emitting component 10 toward two directions. For example, as shown in FIG. 2, each micro-lens 201 is capable of being rotated by +12° to the first preset position from its original position or rotated by −12° to the second preset position from its original position, so that incident light is capable of being reflected along two directions. The original position refers to a position where the micro-lens 201 is located when the light emitted by the light-emitting component 10 is perpendicular to the reflecting surface of the micro-lens 201.

In addition, the first preset position and the second preset position can be set according to actual requirements, such as the shape and the size of the display apparatus. In some examples, a range of an angle between the first preset position and the original position of the micro-lens 201 is [+12°, +20° ]. For example, the angle between the first preset position and the original position is +12°, +14°, +15°, +16°, +19°, or +20°. For example, the display apparatus is applied to a sport utility vehicle, and the angle between the first preset position and the original position is +16°. For another example, the display apparatus is applied to a saloon car, and the angle between the first preset position and the original position is +12°.

In some examples, a range of an angle between the second preset position and the original position is [−20°, −12° ]. For example, the angle between the second preset position and the original position is −12°, −14°, −15°, −16°, −19°, or −20°. For example, the display apparatus is applied to a sport utility vehicle, and the angle between the second preset position and the original position is −16°. For another example, the display apparatus is applied to a saloon car, and the angle between the second preset position and the original position is −12°.

The digital micro-mirror device 20 is cooperated with the light-emitting component 10 and the projection assemblies 30, 40. The light emitted by the light-emitting component 10 is incident on the digital micro-mirror device 20, and at least one micro-lens 201 participating in an image display is rotated to the respective first preset position (or the respective second preset position), and reflects the light to a projection assembly to achieve the image display. At least one micro-lens 201 not participating in the image display is rotated to the second preset position (or the second preset position), and light reflected by the at least one micro-lens is blocked. Displays of different gray scales of the sub-pixels may be achieved by controlling time during which each micro-lens 201 for displaying an image is located at its first preset position or its second preset position, i.e., by controlling a width of a corresponding deflection pulse.

In a case where the first image is displayed, the controller 50 outputs the first image signal to the digital micro-mirror device 20, to control the rotation directions of the plurality of micro-lenses in the digital micro-mirror device 20. At least one micro-lens participating in displaying the first image is rotated to the respective first preset position, and at least one micro-lens not participating in displaying the first image is rotated to the respective second preset position. Since the first projection assembly 30 may receive the light reflected by the at least one micro-lens located at the respective first preset position, the first projection assembly 30 may output the first image. In this case, only the first projection assembly 30 can receive the light reflected by the at least one micro-lens located at the respective first preset position, and the second projection assembly 40 cannot receive the light reflected by the at least one micro-lens located at the respective second preset position since the light is blocked.

In some examples, the at least one micro-lens participating in displaying the first image includes micro-lenses. Depending on different gray scales corresponding to the micro-lenses, time during which the micro-lenses participating in displaying the first image are located at their respective first preset positions will be different. That is, each micro-lens participating in displaying the first image will be rotated toward its second preset position after being located at its first preset position for a predetermined time depending on gray scale displayed by a corresponding sub-pixel. However, the at least one micro-lens not participating in displaying the first image is always located at the respective second preset position in response to receiving the first image signal.

Similarly, in a case where the second image is displayed, the controller 50 outputs the second image signal to the digital micro-mirror device 20, to control the rotation directions of the plurality of micro-lenses in the digital micro-mirror device 20. At least one micro-lens participating in displaying the second image is rotated to the respective second preset position, and at least one micro-lens not participating in displaying the second image is rotated to the respective first preset position. Since the second projection assembly 40 may receive the light reflected by the at least one micro-lens located at the respective second preset position, the second projection assembly 40 may output the second image. In this case, only the second projection assembly 40 can receive the light reflected by the at least one micro-lens located the respective second preset position, the first projection assembly 30 cannot receive the light reflected by the at least one micro-lens located at the respective first preset position since the light is blocked.

In some examples, the at least one micro-lens participating in displaying the second image includes micro-lenses. Depending on different gray scales corresponding to the micro-lenses, time during which micro-lenses participating in displaying the second image are located at the respective second preset positions will be different. Therefore, each micro-lens participating in displaying the second image will be rotated toward the respective first preset position after being located at the respective second preset position for a predetermined time depending on a gray scale displayed by a corresponding sub-pixel. However, the at least one micro-lens not participating in displaying the second image is always located at the respective first preset position in response to receiving the second image signal.

Based on the above description, it will be seen that in a case where the first image signal is output to the digital micro-mirror device 20, the first projection assembly 30 outputs the first image, and the second projection assembly 40 will not receive the light reflected by the micro-lenses. In a case where the second image signal is output to the digital micro-mirror device 20, the second projection assembly 40 outputs the second image, and the first projection assembly 30 will not receive the light reflected by the micro-lenses, and thus the first image and the second image will not affect each other.

On this basis, in a case where the first image signal and the second image signal are alternately output to the digital micro-mirror device 20, the first projection assembly 30 and the second projection assembly 40 alternately output the first image and the second image. The first image signal and the second image signal are switched at a high speed. Due to a visual persistence effect of the human eyes, the human eyes may simultaneously see the first image and the second image on the first projection assembly 30 and the second projection assembly 40. That is, the human eyes may see that the first image and the second image are simultaneously displayed.

It will be noted that the first image signal and the second image signal may be the same or different. For example, the first image signal and the second image signal are the same, and the first image output by the first projection assembly 30 and the second image output by the second projection assembly 40 are the same. For another example, the first image signal and the second image signal are different, and the first image output by the first projection assembly 30 and the second image output by the second projection assembly 40 are different.

In some embodiments, in order to achieve the color display of the display apparatus 01, sub-pixels of at least three colors are required. For example, the sub-pixels of the at least three colors are sub-pixels of three primary colors, which may include at least one red sub-pixel, at least one green sub-pixel and at least one blue sub-pixel, or may include at least one yellow sub-pixel, at least one magenta sub-pixel and at least one cyan sub-pixel.

Based on this, in some embodiments, the first image signal is a single sub-image signal that is a signal for controlling at least one sub-pixel of one color in the sub-pixels of the at least three colors. For example, the sub-pixels of the at least three colors are the sub-pixels of the three primary colors, and the sub-image signal is a signal for controlling at least one sub-pixel of one primary color in the sub-pixels of the three primary colors. For example, the sub-image signal is a signal for controlling at least one red sub-pixel. With this design, the micro-lenses corresponding to the sub-pixels of the three primary colors may reflect the light of the three primary colors respectively to form a first image by outputting three first image signals to the digital micro-mirror device 20.

The second image signal is a sub-image signal that is a signal for controlling at least one sub-pixel of one color of the at least three colors. For example, the sub-pixels of the at least three colors are sub-pixels of the three primary colors, and the sub-image signal is a signal for controlling at least one sub-pixel of one of the three primary colors. For example, the sub-image signal is a signal for controlling at least one red sub-pixel. With this design, the micro-lenses corresponding to the sub-pixels of the three primary colors may reflect the light of the three primary colors respectively to form a second image by outputting three second image signals to the digital micro-mirror device 20.

In some other embodiments, the first image signal is a set of sub-image signals, which includes at least three sub-image signals for respectively controlling the sub-pixels of the at least three colors. For example, the sub-pixels of the at least three colors are the sub-pixels of the three primary colors, and the first image signal includes three sub-image signals, and the three sub-image signals respectively and successively control the sub-pixels of the three primary colors to reflect the light of the three primary colors to form the first image.

The second image signal is a set of sub-image signals, which includes at least three sub-image signals for respectively controlling the sub-pixels of the at least three colors. For example, the sub-pixels of the at least three colors are the sub-pixels of the three primary colors, the second image signal includes three sub-image signals, and the three sub-image signals respectively and successively control the sub-pixels of the three primary colors to reflect the light of the three primary colors to form the second image.

In the display apparatus provided in the above embodiments, in a case where the controller 50 outputs the first image signal to the digital micro-mirror device 20, the first projection assembly 30 may receive the light reflected by the at least one micro-lens located at the digital micro-mirror device 20 and then output the first image. In a case where the controller 50 outputs the second image signal to the digital micro-mirror device 20, the second projection assembly 40 may receive the light reflected by the at least one micro-lens located at the digital micro-mirror device 20 and then output the second image. Therefore, in a case where the controller 50 alternately outputs the first image signal and the second image signal to the digital micro-mirror device 20, the first projection assembly 30 and the second projection assembly 40 may output the first image and the second image, respectively. Thus, the first image and the second image are formed by using a single display apparatus at different times, that is, two image sources are formed. Compared with the related art in which two display sources are achieved by using two display apparatuses, the display apparatus in the above embodiments may reduce the cost and power consumption. In addition, in the display apparatus according to the above embodiments, optical paths forming the first image and the second image are spatially separated from each other, and optical designs may be performed according to respective imaging requirements, thereby reducing optical design difficulty and improving design flexibility.

In some embodiments, as shown in FIGS. 3 and 4, the controller 50 includes an image controller 501 and an optical path controller 502. The image controller 501 is electrically connected to the digital micro-mirror device 20 and is configured to alternately output the first image signal and the second image signal to the digital micro-mirror device 20. The optical path controller 502 is electrically connected to the image controller 501, and is configured to block the light reflected by the at least one micro-lens located at the respective second preset position from entering the second projection assembly 40 during the output of the first image, and block the light reflected by the at least one micro-lens located at the respective first preset position from entering the first projection assembly 30 during the output of the second image.

For example, the image controller 501 is a chip or a control board. The image controller 501 outputs the first image signal and the second image signal to the digital micro-mirror device 20 to control rotations of the plurality of micro-lenses in the digital micro-mirror device 20. For example, in a case where the image controller 501 outputs the first image signal, the first projection assembly 30 receives the light reflected by the at least one micro-lens located at the respective first preset position after the rotations of the plurality of micro-lenses in the digital micro-mirror device 20, and then outputs the first image. In a case where the image controller 501 outputs the second image signal, the second projection assembly 40 receives the light reflected by the at least one micro-lens located at the respective second preset position after the rotations of the plurality of micro-lenses in the digital micro-mirror device 20, and then outputs the second image.

There are a plurality of structures of the optical path controller 502, which include but not limited to structures in a plurality of embodiments shown below.

In some embodiments, as shown in FIG. 3, the optical path controller 502 includes a first optical switch 601 and a second optical switch 602. The first optical switch 601 is disposed between the digital micro-mirror device 20 and the first projection assembly 30, and the second optical switch 602 is disposed between the digital micro-mirror device 20 and the second projection assembly 40.

Specific structures of the first optical switch 601 and the second optical switch 602 are not limited, and may be any element capable of making the optical paths on and off. For example, the first optical switch 601 is a liquid crystal light valve or a mechanical shutter, and the second optical switch 602 is a liquid crystal light valve or a mechanical shutter.

Here, when the first image signal is output to the digital micro-mirror device 20, the first optical switch 601 is turned on, and the light reflected by the at least one micro-lens located at the respective first preset position passes through the first optical switch 601, and is received by the first projection assembly 30. In this case, the second optical switch 602 is turned off, and the light reflected by the at least one micro-lens located at the respective second preset position is blocked by the second optical switch 602 and cannot be received by the second projection assembly 40.

When the second image signal is output to the digital micro-mirror device 20, the second optical switch 602 is turned on, and the light reflected by the at least one micro-lens located at the respective second preset position passes through the second optical switch 602, and is received by the second projection assembly 40. In this case, the first optical switch 601 is turned off, and the light reflected by the at least one micro-lens located at the respective first preset position is blocked by the first optical switch 601 and cannot be received by the first projection assembly 30.

When the first image signal and the second image signal are alternately output to the digital micro-mirror device 20, the first optical switch 601 and the second optical switch 602 are alternately turned on.

In some other embodiments, as shown in FIG. 4, the optical path controller 502 includes a first polarizer 603, a second polarizer 604 and a polarization conversion element 605. The first polarizer 603 is disposed between the digital micro-mirror device 20 and the first projection assembly 30. The second polarizer 604 is disposed between the digital micro-mirror device 20 and the second projection assembly 40. The polarization conversion element 605 is disposed on an optical path of light emitted by the light-emitting component 10. The polarization conversion element 605 has a first polarization state and a second polarization state that are switchable, and a polarization direction of the first polarization state is perpendicular to a polarization direction of the second polarization state. Moreover, the polarization direction of the first polarization state is the same as a polarization direction of the first polarizer 603, and the polarization direction of the second polarization state is the same as a polarization direction of the second polarizer 604.

When the polarization conversion element 605 is in the first polarization state, after the light emitted by the light-emitting component 10 is directed toward the polarization conversion element 605, only light in the first polarization state may pass through the polarization conversion element 605. After passing through the polarization conversion element 605 and being directed toward the digital micro-mirror device 20, the light in the first polarization state is reflected toward the first projection assembly 30 and the second projection assembly 40. Since the polarization direction of the first polarizer 603 is the same as the polarization direction of the first polarization state, the light in the first polarization state reflected by the digital micro-mirror device 20 may pass through the first polarizer 603 and be received by the first projection assembly 30. However, since the polarization direction of the second polarizer 604 is perpendicular to the polarization direction of the first polarization state, the light in the first polarization state reflected by the digital micro-mirror device 20 may be blocked by the second polarizer 604. Based on this, when the first image signal is output to the digital micro-mirror device 20, the polarization conversion element 605 is controlled to be in the first polarization state, so that the light in the first polarization state is received by the first projection assembly 30.

Similarly, when the polarization conversion element 605 is in the second polarization state, after the light emitted by the light-emitting component 10 is directed toward the polarization conversion element 605, only light in the second polarization state may pass through the polarization conversion element 605. After passing through the polarization conversion element 605 and being directed toward the digital micro-mirror device 20, the light in the second polarization state is reflected toward the first projection assembly 30 and the second projection assembly 40. Since the polarization direction of the second polarizer 604 is the same as the polarization direction of the second polarization state, the light in the second polarization state reflected by the digital micro-mirror device 20 may pass through the second polarizer 604 and be received by the second projection assembly 40. Since the polarization direction of the first polarizer 603 is perpendicular to the polarization direction of the second polarization state, the light in the second polarization state reflected by the digital micro-mirror device 20 may be blocked by the first polarizer 603. Based on this, when the second image signal is output to the digital micro-mirror device 20, the polarization conversion element 605 is controlled to be in the second polarization state, so that the light in the second polarization state is received by the second projection assembly 40. When the first image signal and the second image signal are alternately output to the digital micro-mirror device 20, the polarization conversion element 605 is alternately switched to be in the first polarization state and the second polarization state.

The embodiments of the present disclosure do not limit types of the first polarizer 603 and the second polarizer 604. For example, the first polarizer 603 is a dye polarizer or a metal wire grid polarizer, and the second polarizer 604 is a dye polarizer or a metal wire grid polarizer.

It will be noted that the image controller 501 and the optical path controller 502 may communicate with each other, so that switching of image signals and switching of turning-on and turning-off states of the optical paths may be synchronized to ensure that the first image and the second image may be correctly displayed. By providing two sub-controllers, i.e., the image controller 501 and the optical path controller 502, the rotations of the plurality of micro-lenses in the digital micro-mirror device 20 may be controlled by the image controller 501 to form an image, and the turning-on and turning-off states of the optical paths are controlled by the optical path controller 502. Thus, formations of the images and the turning-on and turning-off states of the optical paths may be separately controlled, and a problem that the formations of the images and the turning-on and turning-off states of the optical paths affect each other through control of a single sub-controller may be avoided. Moreover, when one of the sub-controllers has a problem, a replacement or repair can be performed only for the sub-controller having the problem.

In addition, during the display of the first image, the light reflected by the at least one micro-lens located at the respective second preset position may be directed toward the second projection assembly 40, and the light is stray light not required for subsequently displaying the second image.

Therefore, in a process that the image controller switches the first image signal and the second image signal at a high speed, when the plurality of micro-lenses respond to the first image signal, the light reflected by the at least one micro-lens located at the respective second preset position is blocked from entering the second projection assembly 40 by using the optical path controller 502, which may prevent the second projection assembly 40 from receiving the stray light described above, so that the stray light described above is not doped in the second image subsequently output by the second projection assembly 40, thereby effectively improving a display quality of the second image output by the second projection assembly 40.

Similarly, during the output of the second image, the light reflected by the at least one micro-lens located at the respective first preset position will be directed toward the first projection assembly 30, which is stray light not required for subsequently displaying the first image. Therefore, in the process that the image controller switches the first image signal and the second image signal at a high speed, when the plurality of micro-lenses respond to the second image signal, the light reflected by the at least one micro-lens located at the respective first preset position is blocked from being directed toward the first projection assembly 30 by using the optical path controller 502, which may prevent the first projection assembly 30 from receiving the stray light described above, so that the stray light described above is not doped in the first image subsequently output by the first projection assembly 30, thereby effectively improving a display quality of the first image output by the first projection assembly 30.

In some embodiments, as shown in FIG. 5, the display apparatus further includes a first adjusting component 70 disposed on an optical path of the light emitted by the light-emitting component 10, and the first adjusting component 70 is configured to adjust the direction of the light emitted by the light-emitting component 10 to direct the adjusted light toward the digital micro-mirror device 20.

A structure of the first adjusting component 70 is not limited. For example, as shown in FIG. 5, the first adjusting component 70 includes a mirror. It will be understood that the first adjusting component 70 is not limited to including only a single mirror. When the direction of the light emitted by the light-emitting component 10 is required to be adjusted a plurality of times, the first adjusting component 70 includes a plurality of mirrors or includes at least one mirror and at least one refractor. The refractor is, for example, a lens.

Here, the light emitted by the light-emitting component 10 is reflected toward two directions after being directed toward the digital micro-mirror device 20. The light-emitting component 10 may be placed outside a plane where the two reflected light beams are located by providing the first adjusting component 70, so as to prevent the light-emitting component 10 from blocking the reflected light. For example, when a position of the light-emitting component 10 is set, the light emitted by the light-emitting component 10 may be made parallel to a surface of the digital micro-mirror device 20, adjusted by the first adjusting component 70, and then redirected and perpendicularly incident on the digital micro-mirror device 20.

It will be noted that since the display apparatus includes the first adjusting component 70, and the first adjusting component 70 may adjust the light emitted by the light-emitting component 10, and then direct the adjusted light toward the digital micro-mirror device 20, the position of the light-emitting component 10 may be arbitrarily set. Thus, when a volume of the light-emitting component 10 is relatively large, the position of the light-emitting component 10 may be selected as needed, thereby preventing the light-emitting component 10 from blocking the light reflected by the digital micro-mirror device 20 toward the first projection assembly 30 or the second projection assembly 40.

Structures of the first projection assembly 30 and the second projection assembly 40 are not limited here, as long as the first projection assembly 30 and the second projection assembly 40 may output images.

In some embodiments, as shown in FIG. 1, the first projection assembly 30 includes a first imaging lens 301 and a first display screen 302. The second projection assembly 40 includes a second imaging lens 401 and a second display screen 402. The first imaging lens 301 is configured to receive the light reflected by the at least one micro-lens located at the respective first preset position and form the first image. The first display screen 302 is configured to display the first image. The second imaging lens 401 is configured to receive the light reflected by the at least one micro-lens located at the respective second preset position and form the second image. The second display screen 402 is configured to display the second image.

In some examples, the first display screen 302 is a diffuser plate or frosted glass, and the second display screen 402 is a diffuser plate or frosted glass. With this design, the first display screen 302 and the second display screen 402 may have high luminance and high diffusivities, which is advantageous for improving luminance of images and a softness of light, and enhancing display effects of the images.

Figure 6:
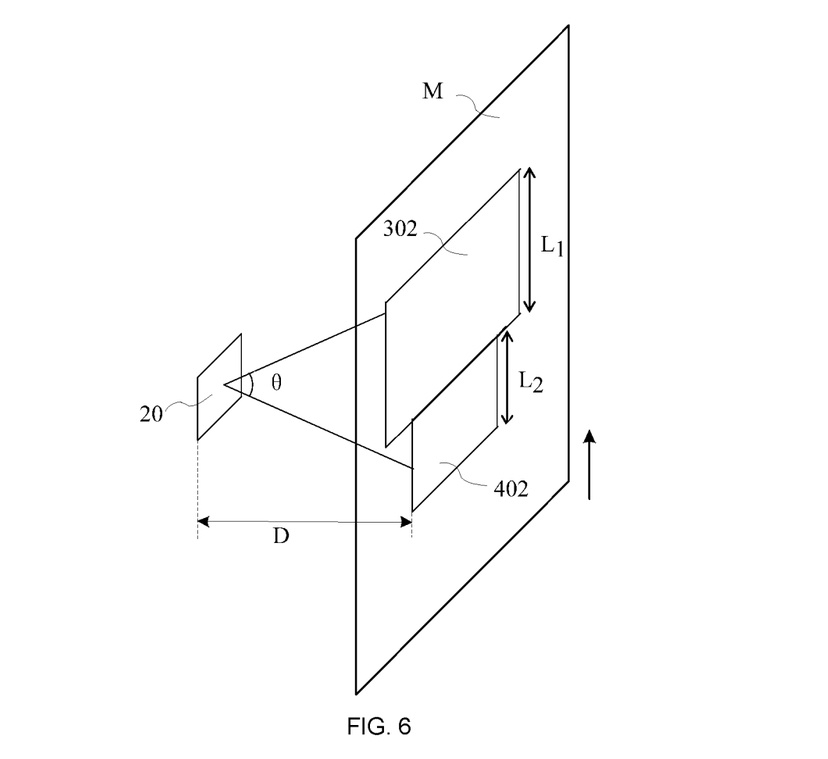
FIG. 6 is a schematic diagram showing a distribution of a digital micro-mirror device, a first display screen and a second display screen, in accordance with some embodiments.

In some embodiments, with reference to FIG. 6, a distance from the digital micro-mirror device 20 to the first display screen 302 in a direction perpendicular to the first display screen 302 and a distance from the digital micro-mirror device 20 to the second display screen 402 in a direction perpendicular to the second display screen 402 are greater than or equal to a set distance D, wherein D is a quotient of a sum of $L_1$ and $L_2$ divided by a product of two and $$\tan\frac{\theta}{2} \left( \text{i.e.,} \ D = \frac{L_1 + L_2}{2 \cdot \tan\frac{\theta}{2}} \right).$$

$L_1$ is a size of the first display screen 302 in a set direction, $L_2$ is a size of the second display screen 402 in the set direction, and θ is an angle between light reflected by one micro-lens of the plurality of micro-lenses when the micro-lens is in its first preset position and light reflected by the micro-lens when the micro-lens is in its second preset position. In this way, the first display screen 302 and the second display screen 402 will not be spatially overlapped with each other, thereby improving display effects of the first image and the second image.

It will be noted that the set direction is an arrangement direction of orthographic projections of the first display screen 302 and the second display screen 402 on a reference plane M parallel to the first display screen 302 and the second display screen 402 (a direction as indicated by a single arrow in FIG. 6).

With reference to FIGS. 2 and 6, it will be seen that if the angle between light reflected by a micro-lens located at its first preset position and light reflected by the micro-lens located at its second preset position is θ, a rotation angle of the micro-lens is −θ/4 or +θ/4, and after light emitted by the light-emitting component 10 is reflected by the micro-lens, a rotation angle of the light is −θ/2 or +θ/2. For example, θ is greater than or equal to 48° and is less than or equal to 80°. For example, θ is 48°, 60° or 80°.

When the size of the first display screen 302 is 1.8 inches (approximately 41 mm×21 mm) and the size of the second display screen 402 is 3.1 inches (approximately 68 mm×41 mm), a width of the first display screen 302 is 21 mm, and a width of the second display screen 402 is 41 mm. In this case, if θ is 48°, a minimum distance D between the digital micro-mirror device 20 and both the first display screen 302 and the second display screen 402 is approximately $$70\text{mm}\left(D = \frac{(41\text{mm} + 21\text{mm})}{2 \times \tan(48°/2)} \approx 70\text{mm}\right).$$

Therefore, when positions of the first display screen 302 and the digital micro-mirror device 20 and positions of the second display screen 402 and the digital micro-mirror device 20 are set, it will be ensured that the distance from the digital micro-mirror device 20 to the first display screen 302 in a direction perpendicular to the first display screen 302 and the distance from the digital micro-mirror device 20 to the second display screen 402 in a direction perpendicular to the second display screen 402 are greater than or equal to 70 mm, so that the first image displayed by the first display screen 302 and the second image displayed by the second display screen 402 are spatially separated. The distance from the digital micro-mirror device 20 to the first display screen 302 in the direction perpendicular to the first display screen 302 and the distance from the digital micro-mirror device 20 to the second display screen 402 in the direction perpendicular to the second display screen 402 may be the same or different, as long as the requirement described above is satisfied, and both may be set according to actual needs.

It will be noted that the display apparatus in some embodiments described above may be applied to a plurality of fields, for example, the field of the HUDs, and two image sources may be provided through a single display apparatus. In some other examples, the display apparatus is applied to the field of projectors to achieve dual projections by using a single projector. In some other examples, the display apparatus is applied to the three-dimensional field. In this case, the first image and the second image are different, and the first image and the second image are respectively directed toward left and right eyes of a viewer, etc., which are not enumerated here.

Figure 7:
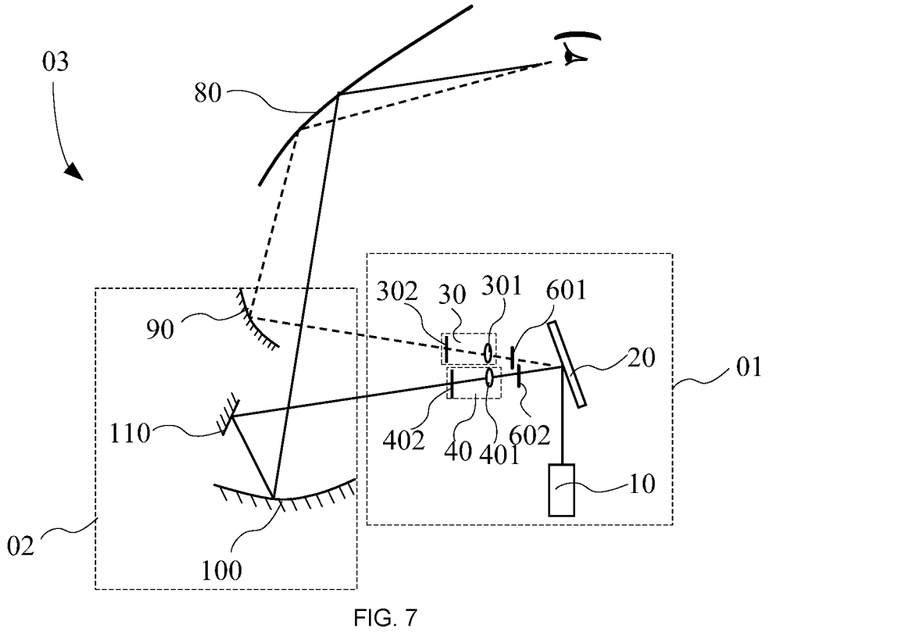
FIG. 7 is a schematic diagram showing a structure of a head-up display system, in accordance with some embodiments.
Figure 8:
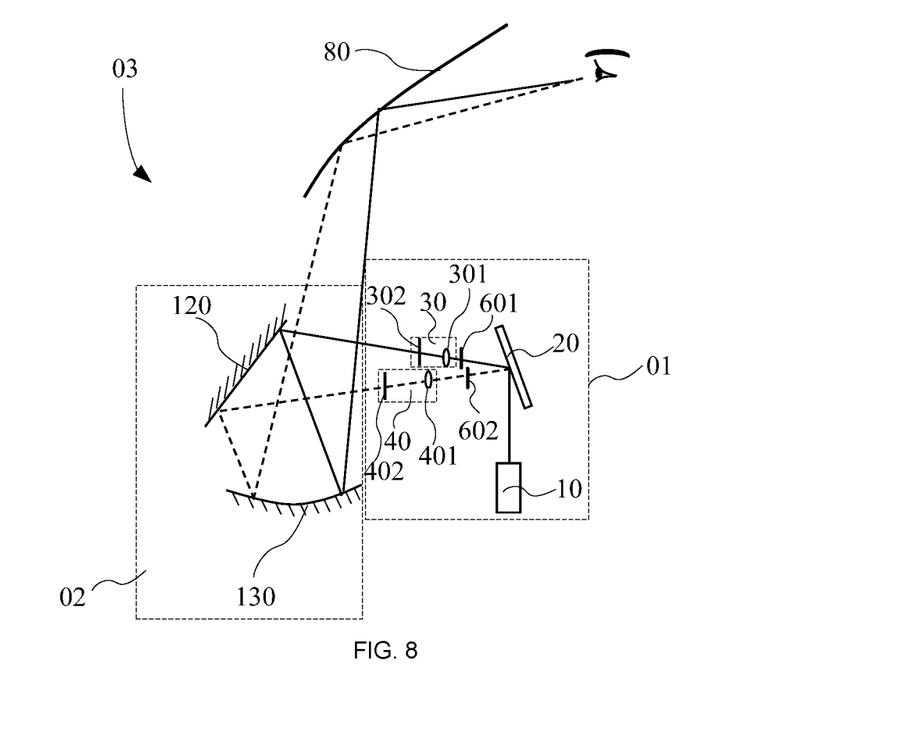
FIG. 8 is a schematic diagram showing a structure of another head-up display system, in accordance with some embodiments.

Some embodiments of the present disclosure provide a head-up display system 03, and as shown in FIGS. 7 and 8, the head-up display system 03 includes the display apparatus 01 described above.

In some embodiments, the head-up display system 03 further includes a second adjusting component 02. The second adjusting component 02 is configured to reflect the first image and the second image displayed by the display apparatus 01 to different positions of a projection screen 80.

A structure of the second adjusting component 02 is not limited, as long as the first image and the second image displayed by the display apparatus may be reflected to different positions of the projection screen 80. For example, the second adjusting component 02 is a mirror. For another example, the second adjusting component 02 is a free-form surface mirror. For another example, the second adjusting component 02 includes a mirror and a free-form surface mirror.

Here, the selection of the projection screen 80 is related to application scenarios of the head-up display system 03. For example, when the head-up display system 03 is applied to a vehicle or an airplane, the projection screen 80 is a transflective component, such as a windshield. The projection screen 80 may also be a projection board of the head-up display system 03. The transflective component may not only allow a part of light to pass through, but also reflect a part of the light to the human eyes, so that a user sees an image on the transflective component.

Since the state projection and the augmented reality projection are projections of an environment which is more than a few meters away from the head-up display system 03, that is, the state projection and the enhanced display projection are projections of an environment far away from the user, if the state projection and the augmented reality projection are directly projected on the projection screen 80, an image on the projection screen 80 will be very small, which is difficult for the user to see clearly. Based on this, the second adjusting component 02 may be used to enlarge the first image and the second image displayed by the display apparatus 01 and then reflect the enlarged first and second images to different positions of the projection screen 80, so that the user may see the enlarged two images through the head-up display system 03.

The second adjusting component 02 may have a plurality of structures, which include but not limited to structures in the embodiments shown below.

In some embodiments, as shown in FIG. 7, the second adjusting component 02 includes a first free-form surface mirror 90, a second free-form surface mirror 100 and a first mirror 110. The first free-form surface mirror 90 is configured to enlarge the first image displayed by the display apparatus 01 and reflect the enlarged first image to the projection screen 80. The first mirror 110 is configured to reflect the second image displayed by the display apparatus 01 to the second free-form surface mirror 100. The second free-form surface mirror 100 is configured to enlarge the second image, and reflect the enlarged second image to the projection screen 80.

The first free-form surface mirror 90 and the second free-form surface mirror 100 may be the same or different, which are not limited here. The first image is reflected by the first free-form surface mirror 90, and an enlarged virtual image is formed on the projection screen 80. The second image is reflected by the second free-form surface mirror 100, and an enlarged virtual image is formed on the projection screen 80. A focal length of the first free-form surface mirror 90 and a distance from the first image to the first free-form surface mirror 90, that is, an object distance, affect an image distance of an image formed on the projection screen 80 by the first image through the first free-form surface mirror 90. Similarly, a focal length of the second free-form surface mirror 100 and a distance from the second image to the second free-form surface mirror 100, that is, the object distance, affect an image distance of an image formed on the projection screen 80 by the second image through the second free-form surface mirror 100.

Based on this, the image distance of the image formed by the first image may be the same as the image distance of the image formed by the second image by adjusting conditions such as the focal length of the first free-form surface mirror 90, the focal length of the second free-form surface mirror 100, the distance from the first image to the first free-form surface mirror 90 and the distance from the second image to the second free-form surface mirror 100. The image distance of the image formed by the first image may be different from the image distance of the image formed by the second image by adjusting the conditions described above. Since the first image is displayed on the first projection assembly 30, that is, the first image is displayed on the first display screen 302, the distance from the first image to the first free-form surface mirror 90 is a distance from the first display screen 302 to the first free-form surface mirror 90. Similarly, since the second image is displayed on the second projection assembly 40, that is, the second image is displayed on the second display screen 402, the distance from the second image to the second free-form surface mirror 100 is a distance from the second display screen 402 to the second free-form surface mirror 100.

In some embodiments, the first projection assembly 30 includes the first imaging lens 301 and the first display screen 302, and a position of the first image may be adjusted by adjusting a focal length of the first imaging lens 301 and a distance from the first imaging lens 301 to the digital micro-mirror device 20, thereby adjusting the distance from the first image to the first free-form surface mirror 90. Similarly, the second projection assembly 40 includes the second imaging lens 401 and the second display screen 402, and a position of the second image may be adjusted by adjusting a focal length of the second imaging lens 401 and a distance from the second imaging lens 401 to the digital micro-mirror device 20, thereby adjusting the distance from the second image to the second free-form surface mirror 100.

It will be noted that since an imaging distance of the augmented reality projection is generally greater than an imaging distance of the state projection, the second image is first directed toward the first mirror 110 and then reflected by the first mirror 110 to the second free-form surface mirror 100, which is equivalent to increasing the distance from the second image to the second free-form surface mirror 100, that is, increasing the object distance. Therefore, in a case where the first free-form surface mirror 90 and the second free-form surface mirror 100 have a same focal length, the image formed by the second image has a farther image distance. Thus, the image formed on the projection screen 80 by the second image through the second free-form surface mirror 100 may corresponds to the augmented reality projection, and the image formed on the projection screen 80 by the first image through the first free-form surface mirror 90 may corresponds to the state projection, so as to avoid that an image of the augmented reality projection on the projection screen 80 is too small.

The image distance of the image formed by the first image is made different from the image distance of the image formed by the second image by setting different object distances in some embodiments described above. Compared with that the image distance of the image formed by the first image is made different from the image distance of the image formed by the second image by setting the focal lengths of the first free-form surface mirror 90 and the second free-form surface mirror 100 to be different, since the optical paths are folded by using the first mirror 110 which reflect the light to the second free-form surface mirror 100, a volume of the head-up display system 03 is reduced.

As described above, the first image is enlarged by the first free-form surface mirror 90 and the enlarged first image is reflected by the first free-form surface mirror 90 onto the projection screen 80, the second image is reflected by the first mirror 110 and then is enlarged by the second free-form surface mirror 100 and the enlarged second image is reflected by the second free-form surface mirror 100 onto the projection screen 80, and positions of the images formed on the projection screen 80 by the first image and the second image are different. Therefore, in a case where a position of the projection screen 80 is constant, a position of the first free-form surface mirror 90 is related to the position of the first image and the first preset position of each micro-lens, the first mirror 110 and the second free-form surface mirror 100 cooperate with and affect each other, and positions of the two are related to the position of the second image and the second preset position of each micro-lens. Moreover, since the first image and the second image are imaged through the first free-form surface mirror 90 and the second free-form surface mirror 100 respectively in the second adjusting component 02 shown in FIG. 7, a design difficulty of the head-up display system may be reduced.

In some other embodiments, as shown in FIG. 8, the second adjusting component 02 includes a second mirror 120 and a third free-form surface mirror 130. The second mirror 120 is configured to reflect the first image and the second image displayed by the display apparatus 01. The third free-form surface mirror 130 is configured to receive the first image reflected by the second mirror 120, enlarge the first image and reflect the enlarged first image to the projection screen, and is configured to receive the second image reflected by the second mirror 120, enlarge the second image and reflect the enlarged second image to the projection screen.

The third free-form surface mirror 130 receives the first image and the second image at different positions. The first image and the second image are both reflected by the third free-form surface mirror 130, and enlarged virtual images are formed on the projection screen 80. An image distance of an image formed by the first image through the third free-form surface mirror 130 is related to a focal length of the third free-form surface mirror 130 at a position where the first image is received, and a distance from the first image to the third free-form surface mirror 130, that is, the object distance. Similarly, an image distance of an image formed by the second image through the third free-form surface mirror 130 is related to a focal length of the third free-form surface mirror 130 at a position where the first image is received, and a distance from the second image to the third free-form surface mirror 130, that is, the object distance.

Based on this, the image distance of the image formed by the first image may be the same as the image distance of the image formed by the second image by adjusting conditions such as a focal length of the third free-form surface mirror 130 at a position where the first image is received, a focal length of the third free-form surface mirror 130 at a position where the second image is received, the distance from the first image to the third free-form surface mirror 130 and the distance from the second image to the third free-form surface mirror 130. Moreover, the image distance of the image formed by the first image may be different from the image distance of the image formed by the second image by adjusting the conditions described above.

Here, the first image and the second image are first directed toward the second mirror 120 and then reflected by the second mirror 120 to the third free-form surface mirror 130, so as to increase the object distance from the first image to the third free-form surface mirror 130 and the object distance from the second image to the third free-form surface mirror 130.

For example, methods of adjusting the distance from the first image to the third free-form surface mirror 130 and the distance from the second image to the third free-form surface mirror 130 include but are not limited to the two methods shown below. One method is to direct the first image and the second image toward different positions of the second mirror 120. Another method is that in a case where the first projection assembly 30 includes the first imaging lens 301 and the first display screen 302, the focal length of the first imaging lens 301 and the distance from the first imaging lens 301 to the digital micro-mirror device 20 may be adjusted to adjust the position of the first image, thereby adjusting the distance from the first image to the third free-form surface mirror 130. Similarly, in a case where the second projection assembly 40 includes the second imaging lens 401 and the second display screen 402, the focal length of the second imaging lens 401 and the distance from the second imaging lens 401 to the digital micro-mirror device 20 may be adjusted to adjust the position of the second image, thereby adjusting the distance from the second image to the second free-form surface mirror 100.

Here, since the optical paths are folded by using the second mirror 120 that reflects the light to the third free-form surface mirror 130, the volume of the head-up display system 03 may be reduced.

Focal lengths of the third free-form surface mirror 130 at different positions may be the same or may be different. In some embodiments, focal lengths of the third free-form surface mirror 130 at different positions are different, so that when the first image and the second image are directed toward different positions of the third free-form surface mirror 130, a focal length of the third free-form surface mirror 130 at a position where the first image is received is different from a focal length of the third free-form surface mirror 130 at a position where the second image is received, thereby the image distance of the image formed by the first image is different from the image distance of the image formed by the second image.

As described above, the first image and the second image are both reflected by the second mirror 120, and then enlarged by the third free-form surface mirror 130, and the enlarged first and second images are reflected by the third free-form surface mirror 130 onto the projection screen 80. That is, the second mirror 120 and the third free-form surface mirror 130 cooperate with and affect each other. Therefore, when the position of the projection screen 80 is constant, positions of the second mirror 120 and the third free-form surface mirror 130 are related to the position of the first image, the position of the second image, the first preset position and the second preset position of each micro-lens. Moreover, since the number of free-form surface mirrors used in the second adjusting component 02 shown in FIG. 8 is small, a volume of the second adjusting component 02 may be reduced.

Figure 9:
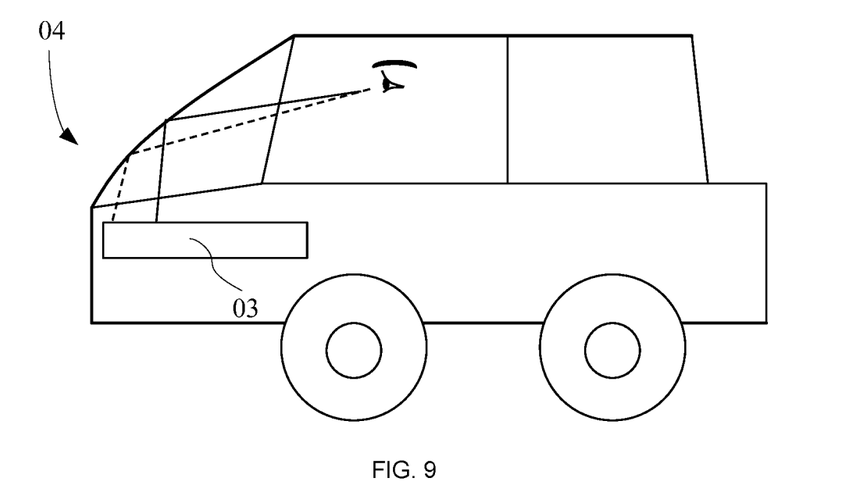
FIG. 9 is a schematic diagram showing a structure of a vehicle, in accordance with some embodiments.

In some embodiments, with reference to FIG. 9, the head-up display system 03 is applied to a vehicle 04. The image distance of the image formed by the first image through the free-form surface mirror is 2 m to 3 m, and the image distance of the image formed by the second image through the free-form surface mirror is 7.5 m to 15 m.

The image distance of the image formed by the first image through the free-form surface mirror is 2 m to 3 m, and thus the image distance is smaller, and a close-range projection may be achieved. A virtual image formed by the first image through the free-form surface mirror may be suspended on a hood, and the first image may be used to display common driving information, such as a vehicle speed, a rotational speed, an oil quantity, etc.

The image distance of the image formed by the second image through the free-form surface mirror is 7.5 m to 15 m, and thus the image distance is larger, and a long-distance projection may be achieved. A virtual image formed by the second image through the free-form surface mirror may be projected on a road and merged with current traffic conditions or surrounding environments. The second image may be used to display more intelligent information such as a collision warning, a lane line deviation, a pedestrian detection, and a distance warning, etc.

The embodiments of the present disclosure do not limit how to make the image distance of the image formed by the first image through the free-form surface mirror be 2 m to 3 m and how to make the image distance of the image formed by the second image through the free-form surface mirror be 7.5 m to 15 m, which may refer to the detailed description of how to adjust the image distance described above, and are not described again here.

With reference to FIG. 9, some embodiments of the present disclosure provide a vehicle 04, which includes the head-up display system 03 according to any embodiment of the above embodiments.

It will be noted that the head-up display system may be disposed in a vehicle of any model or brand.

Since the vehicle includes the head-up display system, when a driver is driving, two images, that is, the first image and the second image, may be simultaneously viewed by using a single display apparatus 01. In addition, when the image distance of the image formed by the first image is 2 m to 3 m and the image distance of the image formed by the second image is 7.5 m to 15 m, the head-up display system may provide two image sources by using a single display apparatus 01 to achieve the state projection and the augmented reality projection.

Figure 10:
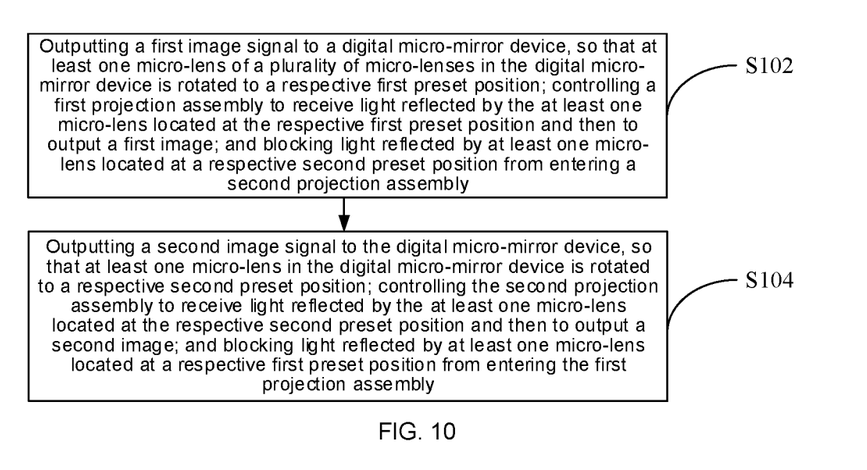
FIG. 10 is flow diagram of a display control method, in accordance with some embodiments.

Some embodiments of the present disclosure provide a display control method, which is applied to the display apparatus according to any embodiment of the above embodiments. With reference to FIG. 10, the display control method includes a plurality of driving cycles, and each driving cycle includes the following steps.

In S102, the first image signal is output to the digital micro-mirror device, so that at least one micro-lens of the plurality of micro-lenses in the digital micro-mirror device is rotated to the respective first preset position. The first projection assembly is controlled to receive the light reflected by the at least one micro-lens located at the respective first preset position and output the first image. The light reflected by the at least one micro-lens located at the second preset position is blocked from entering the second projection assembly.

In S104, the second image signal is output to the digital micro-mirror device, so that at least one micro-lens of the plurality of micro-lenses in the digital micro-mirror device is rotated to the respective second preset position. The second projection assembly is controlled to receive the light reflected by the at least one micro-lens located at the respective second preset position and output the second image. The light reflected by the at least one micro-lens located at the first preset position is blocked from entering the first projection assembly.

The structures of the first projection assembly 30 and the second projection assembly 40 are not limited, as long as the first projection assembly 30 and the second projection assembly 40 may output images. For example, the first projection assembly 30 and the second projection assembly 40 each include the imaging lens and the display screen. The imaging lens is configured to receive the light deflected by at least one micro-lens in the digital micro-mirror device 20 to form an image, and the display screen is configured to display the image formed by the imaging lens.

On this basis, the first image signal and the second image signal may be the same or different. In some examples, the first image signal and the second image signal are the same, and the first image output by the first projection assembly 30 and the second image output by the second projection assembly 40 are the same. In some other examples, the first image signal and the second image signal are different, and the first image output by the first projection assembly 30 and the second image output by the second projection assembly 40 are different.

In the display control method described above, by performing a plurality of driving cycles, the first image signal and the second image signal are alternately outputs to the digital micro-mirror device 20, so that the first projection assembly 30 and the second projection assembly 40 alternately output the first image and the second image. When the first image signal and the second image signal are switched at a high speed, due to the visual persistence effect of the human eyes, the human eyes may simultaneously see the first image and the second image on the first projection assembly 30 and the second projection assembly 40. That is, the human eyes may see that the first image and the second image are simultaneously displayed.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display apparatus, comprising:
   a light-emitting component configured to emit light;
   a controller electrically connected to a digital micro-mirror device, wherein the controller is configured to alternately output a first image signal and a second image signal to the digital micro-mirror device;
   the digital micro-mirror device disposed on a light path of the light emitted by the light-emitting component, wherein the digital micro-mirror device includes a plurality of micro-lenses, each micro-lens is capable of reflecting the light emitted by the light-emitting component, the digital micro-mirror device is configured such that in response to receiving the first image signal, at least one micro-lens is rotated to a respective first preset position, and that in response to receiving the second image signal, at least one micro-lens is rotated to a respective second preset position;
   a first projection assembly configured to receive light reflected by the at least one micro-lens located at the respective first preset position and output a first image; and
   a second projection assembly configured to receive light reflected by the at least one micro-lens located at the respective second preset position and output a second image, wherein
   the controller is further configured to block the light reflected by the at least one micro-lens located at the respective second preset position from entering the second projection assembly during the output of the first image, and to block the light reflected by the at least one micro-lens located at the respective first preset position from entering the first projection assembly during the output of the second image.

2. The display apparatus according to claim 1, wherein the controller includes:
   an image controller electrically connected to the digital micro-mirror device, wherein the image controller is configured to alternately output the first image signal and the second image signal to the digital micro-mirror device; and
   an optical path controller electrically connected to the image controller, wherein the optical path controller is configured to block the light reflected by the at least one micro-lens located at the respective second preset position from entering the second projection assembly during the output of the first image, and to block the light reflected by the at least one micro-lens located at the respective first preset position from entering the first projection assembly during the output of the second image.

3. The display apparatus according to claim 2, wherein the optical path controller includes:
   a first optical switch disposed between the digital micro-mirror device and the first projection assembly; and
   a second optical switch disposed between the digital micro-mirror device and the second projection assembly.

4. The display apparatus according to claim 2, wherein the optical path controller includes:
   a first polarizer disposed between the digital micro-mirror device and the first projection assembly;
   a second polarizer disposed between the digital micro-mirror device and the second projection assembly; and
   a polarization conversion element disposed between the light-emitting component and the digital micro-mirror device, wherein the polarization conversion element has a first polarization state and a second polarization state that are switchable, and a polarization direction of the first polarization state is perpendicular to a polarization direction of the second polarization state; and the polarization direction of the first polarization state is the same as a polarization direction of the first polarizer, and the polarization direction of the second polarization state is the same as a polarization direction of the second polarizer.

5. The display apparatus according to claim 1, further comprising:
   a first adjusting component configured to adjust a direction of the light emitted by the light-emitting component to direct the adjusted light toward the digital micro-mirror device.

6. The display apparatus according to claim 1, wherein
   the light-emitting component includes a plurality of light-emitting diodes capable of emitting light of at least three colors; or
   the light-emitting component includes at least one laser capable of emitting light of at least three colors; or
   the light-emitting component includes an ultra-high performance lamp capable of producing white light and a color wheel configured to divide the white light into light of at least three colors.

7. The display apparatus according to claim 1, wherein the first projection assembly includes:
   a first imaging lens configured to receive the light reflected by the at least one micro-lens located at the respective first preset position and form the first image; and
   a first display screen configured to display the first image; and
   the second projection assembly includes:

a second imaging lens configured to receive the light reflected by the at least one micro-lens located at the respective second preset position and form the second image; and a second display screen configured to display the second image.

8. The display apparatus according to claim 7, wherein a distance from the digital micro-mirror device to the first display screen in a direction perpendicular to the first display screen and a distance from the digital micro-mirror device to the second display screen in a direction perpendicular to the second display screen are greater than or equal to a set distance D, and $$D = \frac{L_1 + L_2}{2 \cdot \tan\frac{\theta}{2}},$$

wherein $L_1$ is a size of the first display screen in a set direction, $L_2$ is a size of the second display screen in the set direction, and $\theta$ is an angle between light reflected by one micro-lens of the plurality of micro-lenses when the micro-lens is located at its first preset position and light reflected by the micro-lens when the micro-lens is located at its second preset position, wherein the set direction is an arrangement direction of orthographic projections of the first display screen and the second display screen on a reference plane, and the reference plane is parallel to the first display screen and the second display screen.

9. A head-up display system, comprising the display apparatus according to claim 1.

10. The head-up display system according to claim 9, further comprising:

a second adjusting component configured to enlarge a first image and a second image displayed by the display apparatus and reflect the enlarged first and second images to different positions of a projection screen.

11. The head-up display system according to claim 10, wherein the second adjusting component includes:

a first free-form surface mirror configured to enlarge the first image displayed by the display apparatus and reflect the enlarged first image to the projection screen;

a first mirror configured to reflect the second image displayed by the display apparatus; and a second free-form surface mirror configured to receive the second image reflected by the first mirror, enlarge the second image and reflect the enlarged second image to the projection screen.

12. The head-up display system according to claim 10, wherein the second adjusting component includes:

a second mirror configured to reflect the first image and the second image displayed by the display apparatus; and a third free-form surface mirror configured to receive the first image reflected by the second mirror, enlarge the first image and reflect the enlarged first image to the projection screen, and to receive the second image reflected by the second mirror, enlarge the second image and reflect the enlarged second image to the projection screen, wherein the third free-form surface mirror is configured to receive the first image and the second image at different positions thereon.

13. The head-up display system according to claim 10, wherein an image distance of an image formed by the first image through the second adjusting component ranges from 2 m to 3 m; and/or, an image distance of an image formed by the second image through the second adjusting component ranges from 7.5 m to 15 m.

14. A vehicle, comprising the head-up display system according to claim 9.

15. A display control method applied to the display apparatus according to claim 1, the display control method comprising a plurality of driving cycles, and each driving cycle including:

outputting a first image signal to a digital micro-mirror device, so that at least one micro-lens of a plurality of micro-lenses in the digital micro-mirror device is rotated to a respective first preset position; controlling a first projection assembly to receive light reflected by the at least one micro-lens located at the respective first preset position and then to output a first image; and blocking light reflected by at least one micro-lens located at a respective second preset position from entering a second projection assembly; and outputting a second image signal to the digital micro-mirror device, so that at least one micro-lens in the digital micro-mirror device is rotated to a respective second preset position; controlling the second projection assembly to receive light reflected by the at least one micro-lens located at the respective second preset position and then to output a second image; and blocking light reflected by at least one micro-lens located at a respective first preset position from entering the first projection assembly.

* * * * *